US012560419B1

(12) United States Patent
Bridwell

(10) Patent No.: US 12,560,419 B1
(45) Date of Patent: Feb. 24, 2026

(54) TAPE MEASURE

(71) Applicant: Jeremy Bridwell, Bath, NC (US)

(72) Inventor: Jeremy Bridwell, Bath, NC (US)

( * ) Notice: Subject to any disclaimer, the term of this patent is extended or adjusted under 35 U.S.C. 154(b) by 363 days.

(21) Appl. No.: 18/214,890

(22) Filed: Jun. 27, 2023

(51) Int. Cl.
  *G01B 3/10* (2020.01)
  *G01B 3/00* (2006.01)
  *G01B 3/1048* (2020.01)
  *G01B 3/1007* (2020.01)

(52) U.S. Cl.
  CPC .......... *G01B 3/1048* (2020.01); *G01B 3/004* (2013.01); *G01B 3/1007* (2020.01)

(58) Field of Classification Search
  CPC .. G01B 3/1041; G01B 3/1046; G01B 3/1048; G01B 3/1061
  USPC .................................................... 33/755–771
  See application file for complete search history.

(56) References Cited

U.S. PATENT DOCUMENTS

| | | | | | |
|---|---|---|---|---|---|
| 1,259,886 | A | * | 3/1918 | McLeod | .............. G01B 3/1084 33/760 |
| 2,076,704 | A | * | 4/1937 | Carlson | ................ G01B 3/1041 33/766 |
| 2,240,753 | A | * | 5/1941 | Tremblay | ............. G01B 3/1041 242/405 |
| 2,658,234 | A | * | 11/1953 | Trammell, Sr. | ......... E05D 13/04 242/380 |
| 3,242,578 | A | * | 3/1966 | Moll | .................... G01B 3/1084 33/771 |
| 3,965,579 | A | | 6/1976 | Woods | |
| 4,466,194 | A | | 8/1984 | Rutty | |
| 4,547,969 | A | * | 10/1985 | Haack | .................. G01B 3/1061 33/760 |
| 4,965,944 | A | * | 10/1990 | Kuze | ...................... G01B 3/563 33/760 |
| 5,172,486 | A | | 12/1992 | Waldherr | |
| 5,481,810 | A | * | 1/1996 | Hastings | ............... B43L 7/0275 33/760 |
| 5,606,803 | A | | 3/1997 | O'Sullivan | |
| 6,098,303 | A | * | 8/2000 | Vogel | .................. G01B 3/1071 33/759 |
| 6,158,139 | A | * | 12/2000 | Bond | ..................... G01B 3/566 33/761 |
| 6,233,789 | B1 | | 5/2001 | Douglas | |
| 6,393,710 | B1 | * | 5/2002 | Hastings | .............. G01B 3/1071 33/760 |
| 6,553,631 | B1 | * | 4/2003 | Douglas | .............. G01B 3/1041 24/3.12 |
| 6,598,311 | B2 | * | 7/2003 | Noon | ........................ G01B 3/10 33/760 |
| 6,691,425 | B1 | * | 2/2004 | Lee | ...................... G01B 3/1056 33/759 |

(Continued)

*Primary Examiner* — George B Bennett
(74) *Attorney, Agent, or Firm* — Cramer Patent & Design, PLLC.; Aaron R. Cramer

(57) ABSTRACT

Embodiments of the present disclosure may include a tape measure including a housing including a first housing portion. Embodiments may also include a second housing portion, and. In some embodiments, the first housing portion may be removably attachable to the second housing portion to form a cavity therebetween. The tape measure has a base having a pair of sharp right and left corners. The length of the base is four inches permitting the user to put the device squarely within a corner or against an edge and then add four inches to the measurement on the tape.

2 Claims, 4 Drawing Sheets

(56)           References Cited

U.S. PATENT DOCUMENTS

| | | | | |
|---|---|---|---|---|
| 6,691,426 | B1 * | 2/2004 | Lee ..................... | G01B 3/1061 |
| | | | | 33/759 |
| 6,807,747 | B1 * | 10/2004 | Hsu ..................... | G01B 3/1005 |
| | | | | 33/760 |
| 7,181,860 | B1 | 2/2007 | Umholtz | |
| 7,219,440 | B2 * | 5/2007 | Lewis ................. | G01B 3/1071 |
| | | | | 33/760 |
| 7,228,644 | B1 * | 6/2007 | Hellem ................... | B25H 7/02 |
| | | | | 33/760 |
| 7,600,326 | B2 * | 10/2009 | Plucknett ............. | G01B 3/1084 |
| | | | | 33/760 |
| 8,402,671 | B1 * | 3/2013 | Marhold .............. | G01B 3/1071 |
| | | | | 33/760 |
| 8,590,170 | B2 * | 11/2013 | Wagner ................ | G01B 3/1041 |
| | | | | 33/760 |
| 8,819,954 | B1 * | 9/2014 | Fernandez ........... | G01B 3/1084 |
| | | | | 33/768 |
| 9,488,458 | B2 * | 11/2016 | Phillips ................ | G01B 3/1084 |
| 9,903,696 | B2 * | 2/2018 | Stewart ................ | G01B 3/1061 |
| 10,788,300 | B2 * | 9/2020 | Suvorov .............. | G01B 3/1003 |
| 11,150,069 | B1 * | 10/2021 | Strong ..................... | G01C 9/06 |
| 11,713,955 | B2 * | 8/2023 | McKinster ............ | G01B 3/102 |
| | | | | 33/755 |
| 12,130,130 | B2 * | 10/2024 | Kang .................... | F21V 23/007 |
| 2004/0172846 | A1 * | 9/2004 | McRae ................. | G01B 3/1041 |
| | | | | 33/760 |
| 2009/0139106 | A1 | 6/2009 | Delaurier | |
| 2009/0271999 | A1 * | 11/2009 | Alker ................... | G01B 3/1041 |
| | | | | 33/761 |
| 2014/0196299 | A1 | 7/2014 | Ouellette et al. | |
| 2014/0250708 | A1 * | 9/2014 | Bauer ................. | G01B 3/1061 |
| | | | | 33/760 |
| 2015/0211834 | A1 | 7/2015 | Dalquist | |

* cited by examiner

TAPE MEASURE

RELATED APPLICATIONS

None.

FIELD OF THE INVENTION

The present invention relates generally to a tape measure and more specifically to a tape measure having improved corner and base features which ensures more accurate and easy measurements.

BACKGROUND OF THE INVENTION

It's important to use the right tools for a job, and when it comes to exact readings, you can't do without an accurate tape measure. Using an accurate tape measure has more benefits than just making things easier. First, it gives accuracy and precision. For any building, woodworking, or do-it-yourself job, getting the measures right is the most important thing. A tape measure that isn't accurate or reliable can cause mistakes and wrong figures, which can lead to parts that don't fit, cuts that aren't straight, and lost materials. By using a reliable tape measure, you can measure with trust and make sure that every measurement is accurate and correct. This accuracy means that the final result will be better and the building process will go more smoothly.

Second, a tape measure that is reliable saves time and effort. Time is an important resource, and you can save hours by using a good measure tool. When numbers aren't right, you often have to re-measure, make changes, or even start over, which wastes time and is frustrating. With a good tape measure, you can trust the numbers from the start, so you don't have to do any extra work and can move forward quickly. Also, a good tape measure lets you take readings quickly and with confidence, which speeds up the whole job and makes you more productive overall.

Using an exact tape measure also makes sure that the results are always the same. Consistency is the key to making something look professional and finished, whether you're building furniture, putting in cabinets, or putting up a building. A precise tape measure makes sure that all lengths are the same, so that parts fit together smoothly. Consistency is the key to symmetry, balance, and good looks, whether you're working on a single piece or several parts that need to fit together correctly. By using a precise tape measure, you can keep a high level of consistency throughout the project, which will make it look and work better as a whole.

Lastly, an accurate tape measure makes it easier for things to work together and be swapped out. When working on a project where parts or pieces need to be replaceable or suitable, it is very important to take accurate measurements. A precise tape measure makes sure that the sizes match up, so that everything fits together well and works well. Whether you're putting together modular furniture, connecting water pipes, or fitting electrical fixtures, you can get the right fit with a good tape measure. This not only keeps you from having to deal with parts that don't fit, but it also helps the project stay strong and last longer. The development of the tape measure of the instant application fulfills this need in a manner that is efficient and cost effective.

SUMMARY OF THE INVENTION

Embodiments of the present disclosure may include a tape measure including a housing including a first housing portion. Embodiments may also include a second housing portion, and. In some embodiments, the first housing portion may be removably attachable to the second housing portion to form a cavity therebetween. Embodiments may include a base having a pair of right angle corners with the base being four inches in length.

In some embodiments, the first housing portion has a planar or concave side surface without protruding elements. In some embodiments, the second housing portion includes a clip affixed to its side surface, enabling the tape measure to suspend from a support structure.

In some embodiments, the tape measure may include an opening at a forward location of the housing, in environmental communication with the cavity. Embodiments may also include a tape blade may be movable within the cavity between a coiled retracted position and an extended position. Embodiments may also include a leading portion of the tape blade includes a restriction element that prevents full travel of the tape blade within the opening, keeping the leading portion of the tape blade outside of the housing.

In some embodiments, the tape measure may include a button extending outward from the housing, in operable communication with a tape reel, providing a lock to limit movement of the tape blade in a first direction. Embodiments may also include motion in an opposing second direction removes the lock and allows movement of the tape blade on the tape reel.

In some embodiments, the tape blade may be an elongate strip of metal material with graduated measurement markings. In some embodiments, the tape measure may include a protrusion extending from the first housing portion, facilitating measurement of square or ninety-degree edges. In some embodiments, the protrusion may be configured as a square marking board.

In some embodiments, the tape measure includes bottom markings on its bottom surface indicating the length of the tape measure. In some embodiments, the bottom markings indicate even measurements for easier addition. In some embodiments, the bottom markings include English or metric measurements, or both. In some embodiments, the tape measure includes rear markings on its rear surface indicating the height of the tape measure.

In some embodiments, the rear markings indicate even measurements for easier addition. In some embodiments, the rear markings may be identical to or in different measurements than the bottom markings. In some embodiments, the tape measure allows for blind measurements and provides an accurate mark for hard-to-reach areas.

In some embodiments, the tape measure enables the user to rest a workpiece on the protrusion and manipulate the tape measure along the length of the workpiece for measuring or marking purposes. Embodiments may also include additional aspects and embodiments of the invention may be defined by the corresponding nonprovisional utility patent application and its claims.

BRIEF DESCRIPTION OF THE DRAWINGS

These and other features, aspects, and advantages of the present disclosure will become better understood with regard to the following description, appended claims, and accompanying drawings where:

---

DESCRIPTIVE KEY

Figure 1:
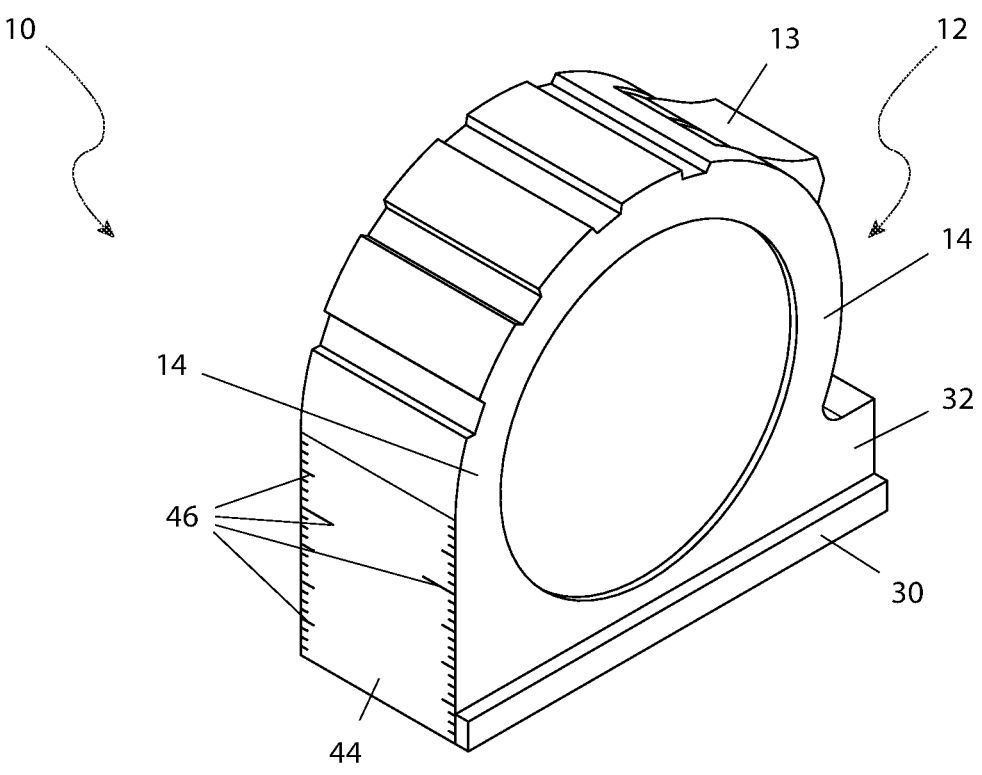
FIG. 1 is a rear left top perspective view of a tape measure 10, according to an embodiment of this disclosure.
Figure 2:
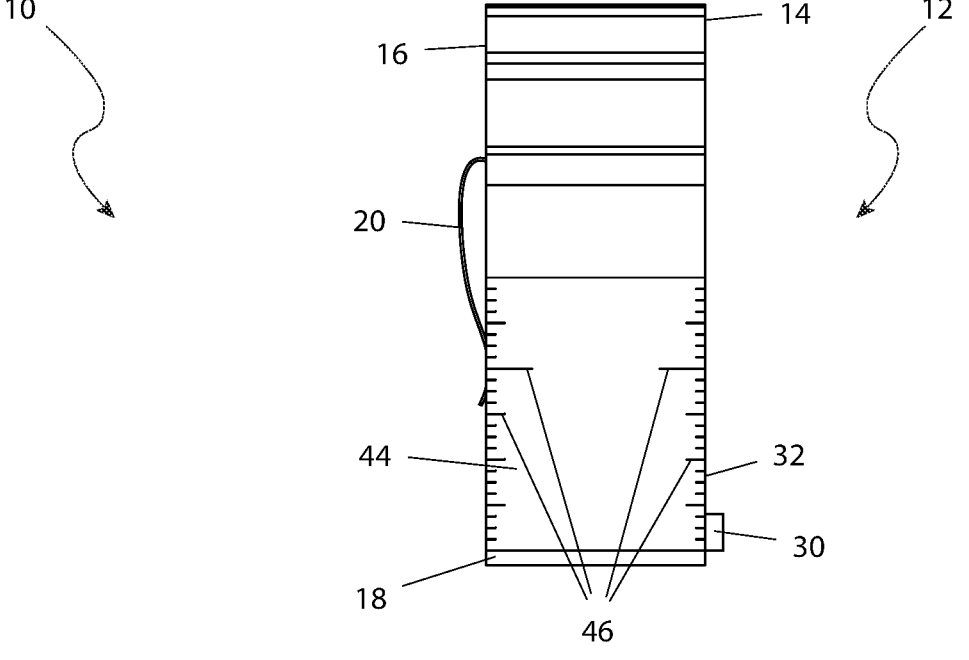
FIG. 2 is a rear elevation view of the tape measure 10, according to an embodiment of this disclosure.

| | |
|---|---|
| 10 | tape measure |
| 12 | housing |
| 13 | button |
| 14 | first housing portion |
| 16 | second housing portion |
| 17 | opening |
| 18 | tape blade |
| 20 | clip |
| 30 | protrusion |
| 32 | side surface |
| 40 | bottom surface |
| 42 | bottom markings |
| 44 | rear surface |
| 46 | rear markings |
| M | mark |
| P | marking implement |
| T | travel path |
| W | workpiece |

---

DETAILED DESCRIPTION

The following disclosure is provided to describe various embodiments of a tape measure 10 having a protrusion 30 and markings 42, 46 used for quick and accurate manipulation of the tape measure 10 about a workpiece W for subsequent marks M placed thereon with a marking implement P. Skilled artisans will appreciate additional embodiments and uses of the present invention that extend beyond the examples of this disclosure. Terms included by any claim that may be presented in any yet-to-be-filed non-provisional patent application are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one (1) of A, B, and C" should be read to permit any of A, B, or C singularly or in combination with the remaining elements. Additionally, such groups may include multiple instances of one (1) or more element in that group, which may be included with other elements of the group. All numbers, measurements, and values are given as approximations unless expressly stated otherwise.

Various aspects of the present disclosure will now be described in detail, without limitation. Skilled readers should not view the inclusion of any alternative labels as limiting in any way.

Referring now to FIGS. 1-5, an illustrative tape measure 10 is shown. In general, a tape measure 10 includes a housing 12 having a first housing portion 14 and a second housing portion 16. The first housing portion 14 is capable of removable attachment to the second housing portion part 16 such that the housing 12 is formed and a cavity exists therebetween. The first housing portion 14 and second housing portion 16 each have a side surface 32. The side surface 32 of the first housing portion is planar or has a concave or sunken section such that there are no protruding elements. The side surface 32 of the second housing portion 16 has a clip 20 affixed thereto, capable of enabling the tape measure 10 to suspend from a support structure.

An opening 17 exists at a forward location of the housing 12 and is in environmental communication with the cavity. The tape measure 10 includes a tape blade 18 moveable within the cavity between a coiled retracted position and an extended position. A leading portion of the tape blade 18 includes a restriction element that restricts full travel of the tape blade 18 within the opening 17 so that the leading portion of the tape blade 18 always resides outside of the housing 12. In the retracted position, the tape blade 18 is wound or coiled onto a tape reel (not shown). A button 13 extends outward from the housing 12 and is in operable communication with the tape reel to provide a lock thereto in order to limit movement of the tape blade 18 when motioned in a first direction. A subsequent motion in the opposing second direction removes the lock and allows movement of the tape blade 18 on the tape reel. The first housing portion 14 and the second housing portion 16 may form around the button 13.

In general, the tape blade 18 is an elongate strip of material including a plurality of graduated measurement markings, and in specific embodiments, the tape blade 18 is an elongate strip of metal material (e.g., steel material) that includes such a restriction element coupled thereto and at the leading portion located at an outer most end. The tape blade 18 also has a concave/convex profile that improves standout/rigidity. As will generally be understood, the tape blade 18 has the concave/convex profile when extended from the housing 12, but a generally flat profile/shape when wound around the tape reel.

Figures 3, 4:
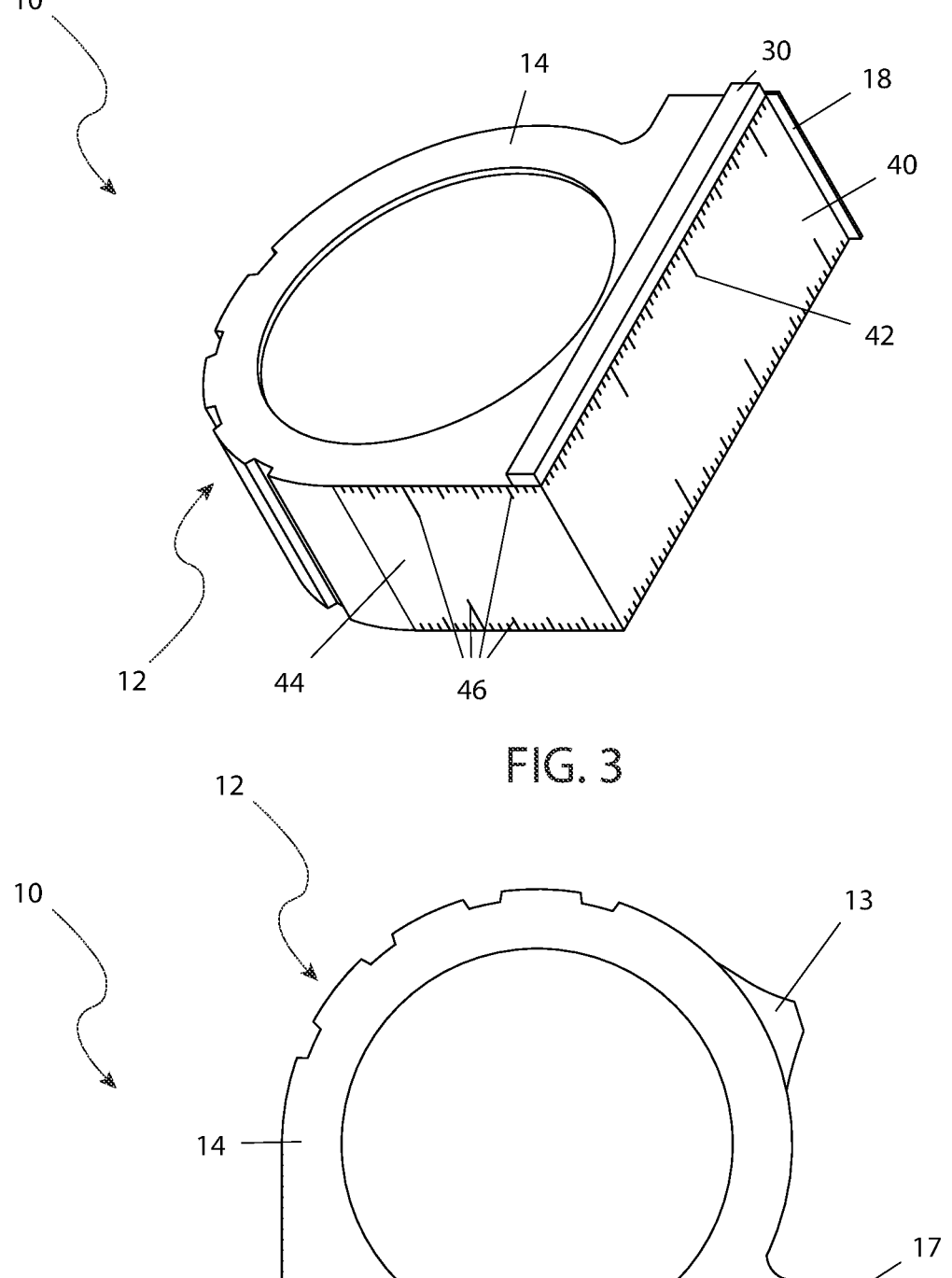
FIG. 3 is a rear left bottom perspective view of the tape measure 10, according to an embodiment of this disclosure.
FIG. 4 is a first side elevation view of a tape measure 10, according to an embodiment of this disclosure.
Figure 5:
FIG. 5 is a second side elevation view of a tape measure 10, according to an embodiment of this disclosure; and, FIG. 6 is an environmental view of a tape measure 10 in an exemplary method of use, according to an embodiment of this disclosure.
Figure 5:
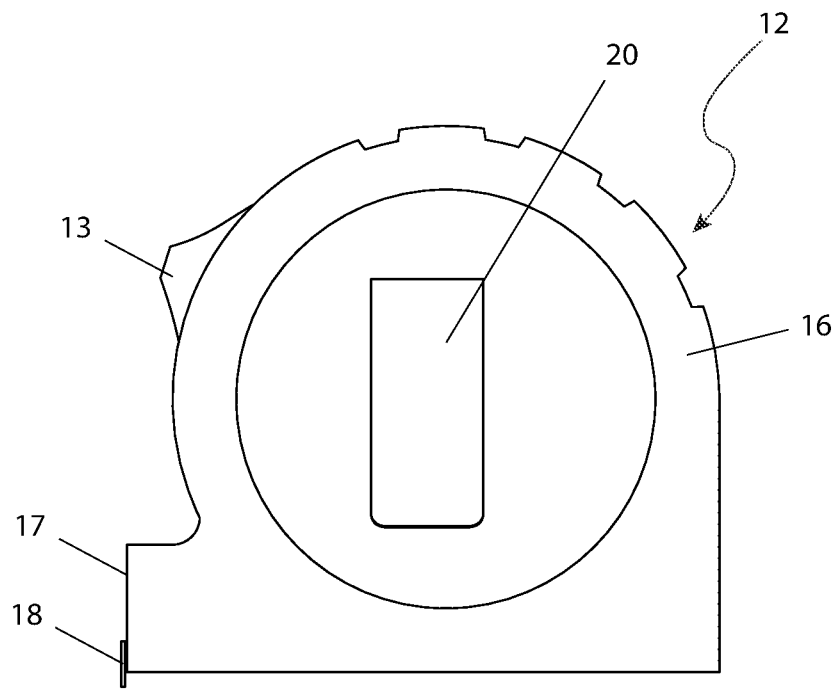

The tape measure 10 further includes a protrusion 30. In some embodiments, the protrusion 30 extends from the first housing portion 14 and is coextensive therewith, as shown in FIGS. 1 and 3. The protrusion 30 extends perpendicularly from a side surface 32 of the first housing portion 14 and located at the terminal bottom edge thereof. The protrusion 30 is configured as a square for marking boards or ninety degree (90°) edges. The protrusion 30 facilitates measuring by removing human error. The tape measure 10 provides the ability to take blind measurements. The protrusion 30 improves on the measuring technique of an inside corner, providing the ability to quickly get properly measurements.

In some embodiments, the tape measure 10 may further include any number of protrusions 30 located at various surfaces on the tape measure 10. For example, a protrusion 30 may be oriented on the second housing portion 16 for a left-handed person, in much the same manner and orientation as in the exemplary embodiment.

As shown in FIG. 3, in some embodiments, a bottom surface 40 of the tape measure 10 includes bottom markings 42 indicating a length of the tape measure 10. The bottom markings 42 indicate the length to an even measurement for easier addition. The bottom markings 42 may include English or metric measurements, or both. This allows the user to lock in the measurement blindly inside of a hard-to-reach area and still provide an accurate mark M.

In some embodiments, a rear surface 44 of the tape measure 10 includes rear markings 46 indicating a height of the tape measure 10. The rear markings 46 indicate a height to an even measurement for easier addition. The rear markings 46 may be identical to or in different measurements than the bottom markings 42.

Figure 6:
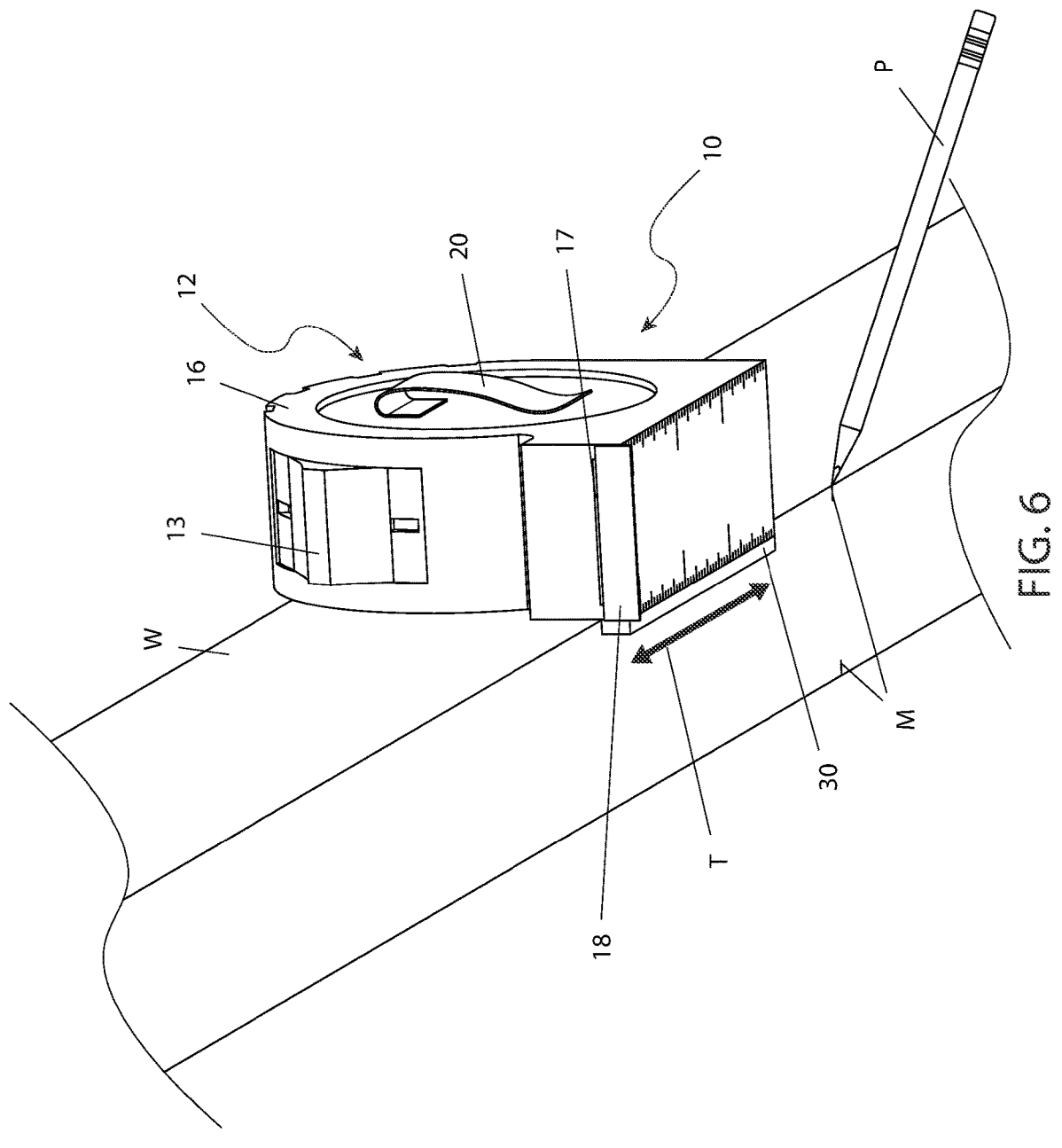

In use, as shown in FIG. 6, the tape measure 10 allows the user to place a mark M at a desired measurement with a marking implement P in a typical manner on a workpiece W. The protrusion 30 allows the user to rest the corner edge of the workpiece W to be measured on the protrusion 30 using the flat edge thereof as a square mark for cutting. The user can then manipulate the tape measure 10 along the length of the corner edge of the workpiece W along a travel path T. This is accomplished with a workpiece W having planar faces, such as a two-by-four (2×4 in.) plank of wood, because the resting area of the protrusion 30 is flat and there are no protruding features on the side surface 32 of the first housing portion 14 which contacts the face of the workpiece W. This avoids the need to have to locate another tool for example, a speed square. If the user only needs to place a mark M on a portion of the workpiece W, the bottom markings 42 and rear markings 46 may be used rather than extending tape blade 18.

While various aspects of the present invention have been described in the above disclosure, the description of this disclosure is intended to illustrate and not limit the scope of the invention. The invention is defined by the scope of the claims of a corresponding nonprovisional utility patent application and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims of a corresponding nonprovisional utility patent application.

What is claimed is:

1. A tape measure comprising:

a housing comprising a first housing portion and a second housing portion, the first housing portion being removably attachable to the second housing portion to form a cavity therebetween;

a tape blade positioned within the cavity and movable between a coiled retracted position and an extended position through an opening at a forward location of the housing, the tape blade including graduated measurement markings;

a button extending outward from the housing and in operable communication with a tape reel to selectively limit movement of the tape blade;

a protrusion extending perpendicularly from a side surface of the first housing portion at a terminal bottom edge thereof, the protrusion having a flat surface configured to contact and support a workpiece to facilitate measurement or marking along a travel path; and, bottom markings located on a bottom surface of the housing indicating a length of the housing and rear markings located on a rear surface of the housing indicating a height of the housing, the bottom markings and the rear markings each indicating even measurements to facilitate blind or additive measurement without extending the tape blade.

2. The tape measure of claim 1, wherein the first housing portion comprises a planar side surface without protruding elements configured to rest flush against a planar face of the workpiece while the protrusion supports the workpiece to provide an accurate square reference edge, enabling sliding movement along the workpiece for marking or measurement without the need for a separate square, and wherein the protrusion is coextensive with the first housing portion and configured to define a ninety-degree marking edge.

* * * * *